Figure 1:
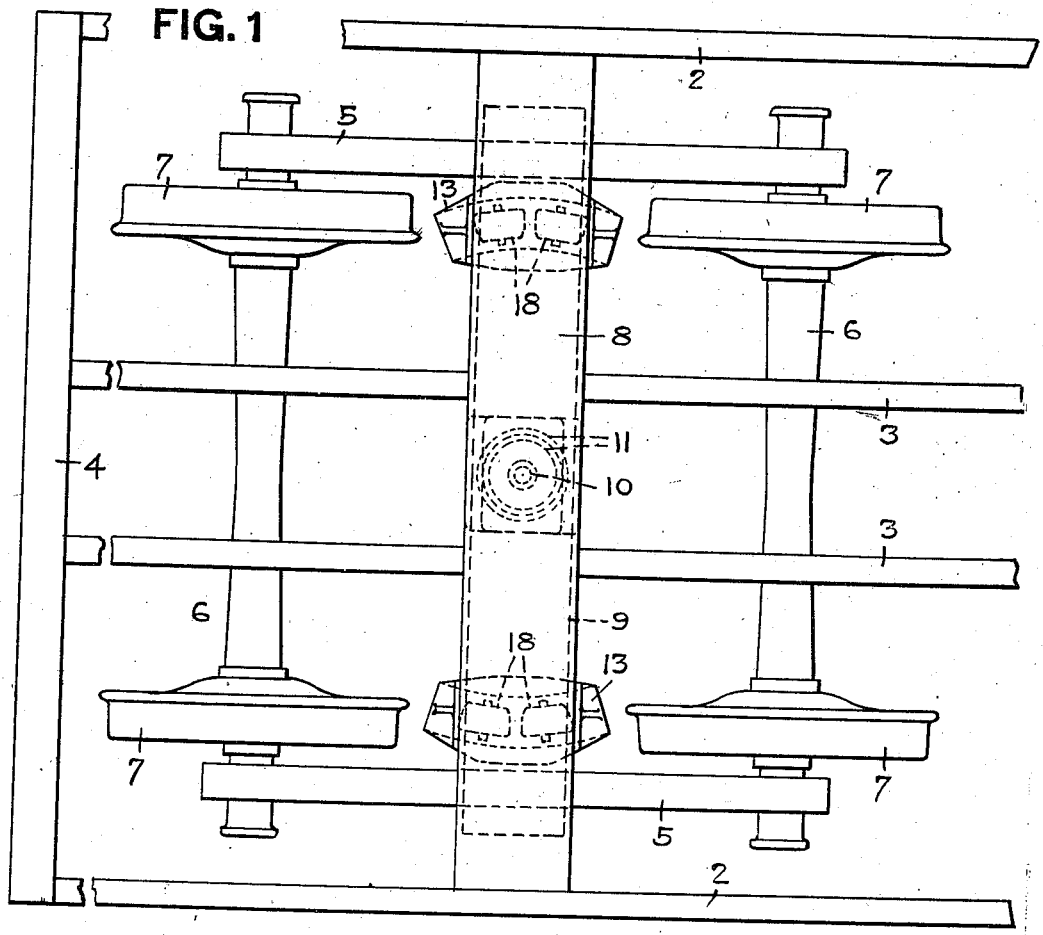

V. J. BURRY.
VEHICLE BODY BEARING.
APPLICATION FILED FEB. 17, 1916.

1,191,153.

Patented July 18, 1916.
3 SHEETS—SHEET 1.

WITNESSES

INVENTOR

V. J. BURRY.
VEHICLE BODY BEARING.
APPLICATION FILED FEB. 17, 1916.
1,191,153.
Patented July 18, 1916.
3 SHEETS—SHEET 2.
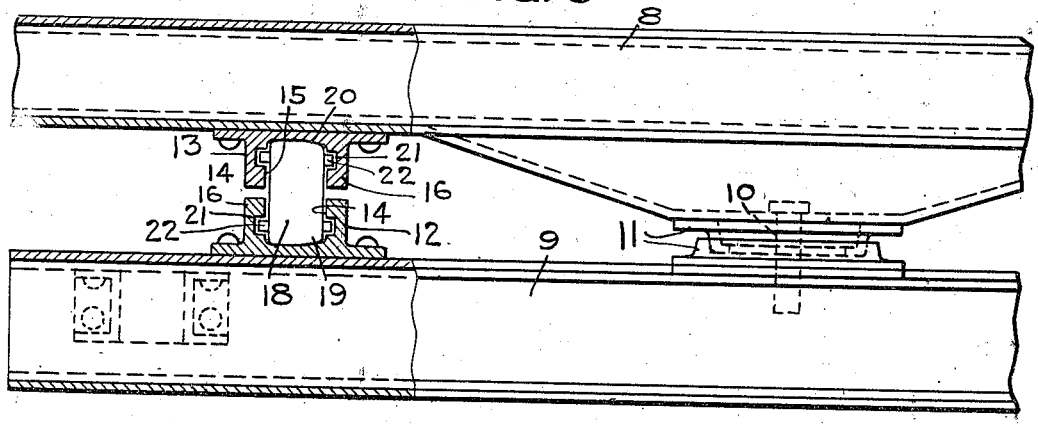
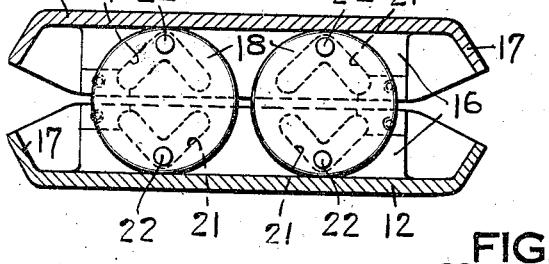
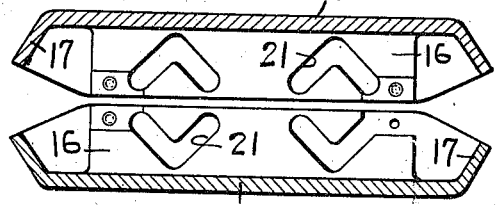
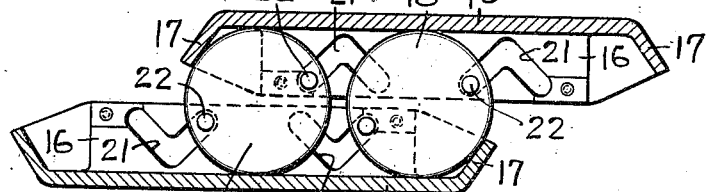
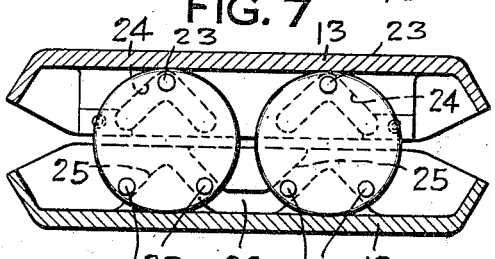
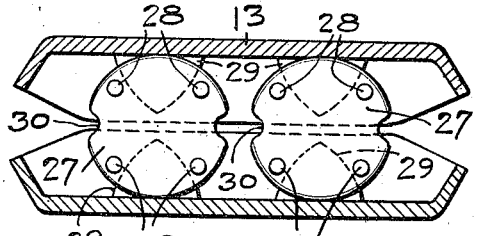
WITNESSES
J. R. Keller
John F. Will
INVENTOR
Vincent J. Burry

V. J. BURRY.
VEHICLE BODY BEARING.
APPLICATION FILED FEB. 17, 1916.

1,191,153.

Patented July 18, 1916.
3 SHEETS—SHEET 3.

WITNESSES
J. R. Keller
John F. Will

INVENTOR
Vincent J. Burry
By Kay Totten Winkel
Attys

UNITED STATES PATENT OFFICE.

VINCENT J. BURRY, OF CORAOPOLIS, PENNSYLVANIA, ASSIGNOR OF ONE-HALF TO LOREN H. TURNER, OF PITTSBURGH, PENNSYLVANIA.

VEHICLE-BODY BEARING.

1,191,153.  Specification of Letters Patent.  Patented July 18, 1916.

Application filed February 17, 1916. Serial No. 78,851.

*To all whom it may concern:*

Be it known that I, VINCENT J. BURRY, a citizen of the United States, and resident of Coraopolis, in the county of Allegheny and State of Pennsylvania, have invented a new and useful Improvement in Vehicle-Body Bearings; and I do hereby declare the following to be a full, clear, and exact description thereof.

My invention relates to bearing devices, particularly though not exclusively adapted for use as side bearing plates or center bearing plates for railway cars, though it is to be understood that the invention may be applied to any vehicle which requires the swiveling of the running gears with reference to the vehicle body. The invention is also adapted for use in other relations where a turntable construction is desired.

One of the objects of my invention is to provide a roller-bearing member in which the rollers or rockers will always be centered or brought back to normal load-bearing position when the truck or running-gear is straightened out with reference to the vehicle body.

A further and very important object of the invention is to cause this centering means to retain the rollers in position beneath the point of application of the load when the car or vehicle tips from side to side when the rollers may be freed from the lower bearing runway under which condition the rollers, if entirely free to travel along the runway would tend to roll to the lowest portion of the lower bearing member, and thus get out from under the central part of application of the load. Means are also provided to sustain or suspend the rollers in the proper position when the car tips, so that when the rollers return to the lower bearing runway they will seat at a point substantially centered beneath the point of application of the load.

A further object of the invention is to provide bearing members which may be in the form of rocking members or not complete rollers, said rocking members so far as their limit of travel is concerned will always be centered beneath the load and moreover means are provided whereby such rocking members can never tip so far that they will fall out of position to receive the load upon their rounded faces. In other words, the rockers will at all times be so held in position that when the car after tipping returns to normal bearing position, the rockers will engage the runways directly on their circular curved faces. Moreover the rollers may be provided with single lugs, or two or more lugs which coöperate with the guideways on the bearing housings which at all times compel their return to centered position under the load, while at the same time these guideways do not in the least interfere with the proper rolling or rocking of the roller members; that is to say, the lugs of the rollers will be practically free of the guideways when the rollers are traveling normally along their runways. It is to be understood, however, that these guide lugs or portions may be a part of or mounted on the housings, and the rollers be provided with guide slots coöperating therewith. This is a mere alternative construction within the broad scope of the invention.

With these and other objects in view, the invention consists in constructions and arrangements of parts, preferred embodiments of which are illustrated in the accompanying drawings, in which—

Figure 2:
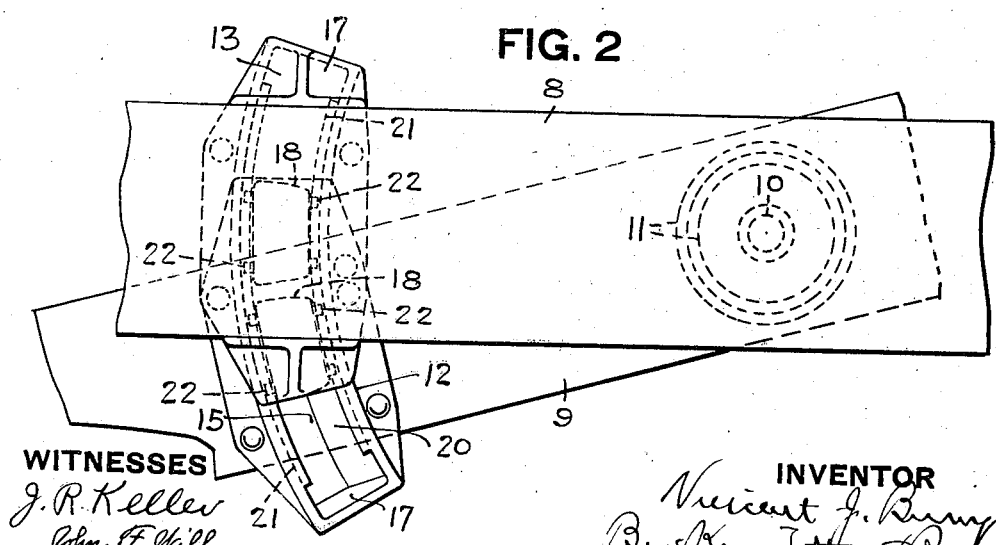
Figure 10:
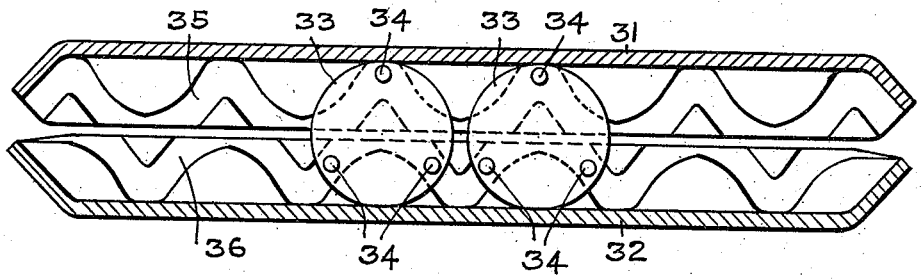
Figure 11:
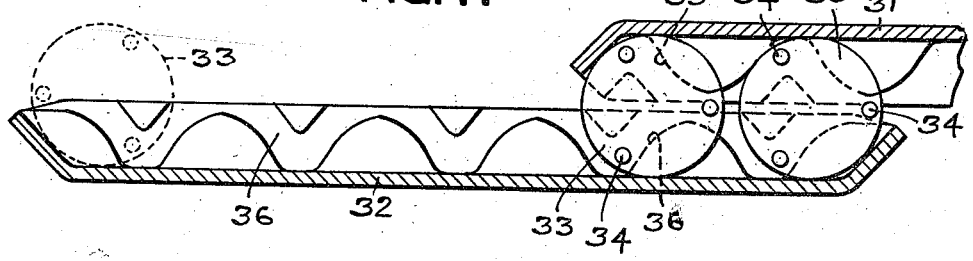
Figure 12:
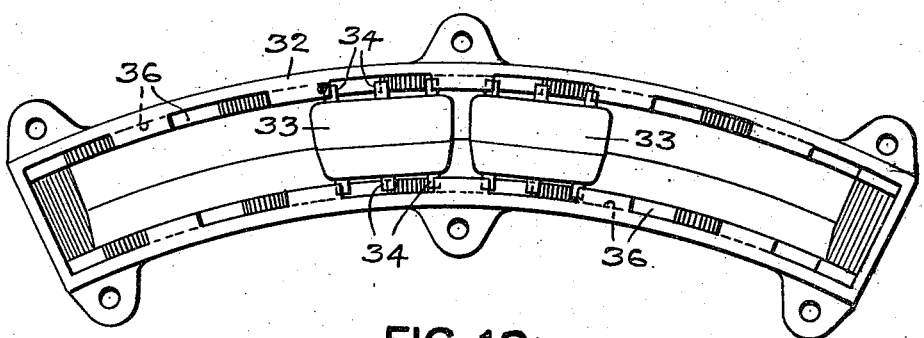
Figure 13:
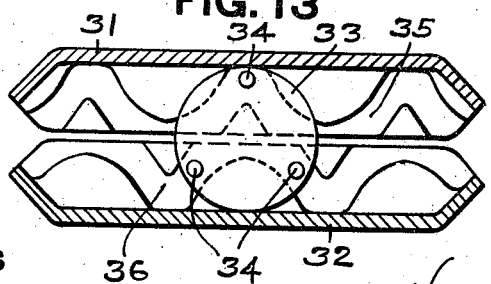

Figure 1 is a plan view of the end of a car body showing the truck beneath and including the improvements constituting this invention. Fig. 2 is a fragmentary plan view of the bearing showing the relative arrangements of parts when the truck has rotated a considerable distance with respect to the car; Fig. 3 is a sectional transverse view showing the bearing relation to an ordinary center plate of the car; Figs. 4, 5 and 6 illustrate one embodiment of the invention; Fig. 7 illustrates a modification; Figs. 8 and 9 illustrate a further modification; Figs. 10, 11 and 12 illustrate a still further modification; and Fig. 13 illustrates a modified form of Fig. 10.

In the embodiment of the invention herein selected for illustration and referring particularly to Figs. 1 and 2 the car side sills are represented by the figures 2—2, the center sills by 3—3, one end sill 4. 5 indicates the truck side frames, 6 the axles and 7 the wheels of a car truck. The car frame may be provided with a body bolster 8 and beneath this in the usual manner may be provided a truck bolster 9. The truck bolster is secured to the body of the car by a king pin 10 and center bearing plates 11, which may be of very simple construction and merely intended to receive end or buffing and lateral thrusts on the car truck. It is not necessary that the center bearing plates be provided with any particular antifriction means, such as rolls, bearing balls and the like, since in my improved construction the center bearing plate need not receive any part of the load. It is only required to prevent the truck from being laterally thrust from under the car body. The side bearings illustrated in these two figures comprise a lower housing 12 secured to the truck bolster and upper housing 13 secured to the car body, or to a body bolster 8. Since the load of the car or vehicle is to be borne practically entirely by the side bearings, the truck bolster need only be a light construction which connects the center bearing with the side bearings. Within the housings 12 and 13 are provided runways 14 and 15 respectively.

Referring now to Figs. 4, 5 and 6, the housings 13 and 14 are provided with side walls 16 and end walls 17 which are inclined outwardly from the ends of the runway, as shown in Figs. 4, 5 and 6. Each runway or housing may be of the length required to meet the curved conditions of the track or roadway on which the vehicle operates. In these runways are mounted rollers or rockers 18. These rollers, as indicated at 19, Fig. 3, are tapered toward the inside or center plate and the runway faces are inclined as at 20, Fig. 3, to fit more or less exactly the contour of the treads of the roller. This construction obviously prevents scraping of the inner sides of the tread on the runways within the housing, since the diameter of the rollers at the inner side of the circle is less than at the outside.

In the particular forms shown in Figs. 3 to 6 the housings are provided with guideways or slots 21, and each roller is provided on the diameter at opposite sides with lugs or pins 22 which travel within these slots when the vehicle swivels. It is to be understood however, that the lugs 22 do not necessarily contact with the sides of the slots 21 during normal travel of the rollers in the housings, but when the car body tilts the upper housing 13 will rise away from the lower housing 14 and if the tilt is sufficient, the uppermost pins 22 which travel in the guideways of the upper housing will engage one or the other of the lower ends of the V-shaped slots 21 in said upper housing and therefore the rollers will be suspended on these upper lugs 22 immediately under the point of application of the load, so that when the car returns to horizontal position transversely the rollers will be seated in the lower housing directly centered under the load and will maintain their same relative position with respect to the housings at all times, so that when the truck straightens out the rollers will be returned to central position in the runways and thus receive the load centrally and ready for the swivel of the truck again in either direction.

In Fig. 7 I have shown a modification of the arrangement in which the rollers are each provided with three pins 23 instead of two pins, as in Figs. 4 to 6, inclusive. The guideways or slots 24 in the upper housing are the same as in the figures heretofore described, whereas the guideways 25 in the lower housing are of V-shape and arranged with their arms in parallelism with the V-shaped guideways of the upper housing. These V-shaped guideways are connected by a horizontal section 26 so that these rollers also will at all times be centered by the guideways 24, 25 and 26 and the rollers will always be returned to normal central position when the truck rights itself.

In Figs. 8 and 9 each of the rockers 27 is provided with four guiding or centering pins 28, and housings 13 and 14 are each provided with guide lugs or inwardly extending projections 29 which when the housings are separated by the tilting of the car coöperate with the guide pins to maintain the rockers in centered position. It will be noticed that in these figures the rotating bearing members are not complete rollers, but are in fact rockers since the limit of travel of these bearing housings is such that the rollers never describe more than an arc of 180 degrees, or half a circle. In fact, they rotate somewhat less than half a circle, leaving the portion 30 of their circumference unused, which portion of course may be cut away in any desired manner for economy of material and the like. It is to be understood that these rockers may have any desired degree of travel less than 180 degrees.

In Figs. 10, 11 and 12 are shown bearing members of much greater extent than the bearing members hereinbefore described. In this form the upper housing 31 and the lower housing 32 are of a considerable arc of a circle, whereas the rollers 33 are, as shown, in Fig. 10 always centered with reference to the load and are kept together or constantly spaced apart by guide pins 34 on the rollers which coöperate with guide passages 35 in the upper housing and 36 in the lower housing. These guide passes or slots may be in the wall of the housing or otherwise provided, but they are so arranged that the rollers may complete several revolutions in the complete travel from one end of the housing 31 to 32. In fact, since the guide lugs and guide slots do not in any way limit the travel of the rollers, it is obvious that these housings might be in the form of a complete circle, if conditions of use of the bearing demanded such a construction. It being understood that the main function of the invention is to maintain rollers at all times properly centered beneath the load, at the same time to permit the freest rotation of the rollers or rockers, and also to return the rollers or rockers to proper centered position beneath the load when the tilted car body returns to normal level position.

In Fig. 13 I have illustrated a modification wherein a single rolling bearing member is employed, and the parts are represented by the same numerals as in Figs. 10, 11 and 12.

It will be observed that in the constructions heretofore described, the rollers or rockers are of unusually large diameter. In practice I find that 6 inches may be the proper diameter, though the rollers may be of larger and of course may be somewhat smaller diameter, if desired, but because of the effective centering and guiding means here provided, the fewest number of rollers may be employed, which at the same time give all the necessary travel to the truck and at the same time support the load at sufficiently separated points on each bearing.

I have used the words "rollers" and "rockers" interchangeably as it is apparent that the roller will perform the function of a rocker where there is not sufficient movement of the bearing-plates to cause a complete revolution of the roller. While, on the other hand, if there is a sufficient movement of the bearing-plates, a complete revolution of the roller may take place as in Figs. 10 and 11. Furthermore, the word "rotatable" as used in the claims is not intended necessarily to mean that the rollers make a complete revolution but is intended to include such a rocking motion as may be necessary to perform the required function. Moreover, it is to be understood that while I have herein described particular embodiments of my invention, the invention is not limited to the construction and arrangement of parts here shown, but said arrangement of parts may be varied extensively within the scope of the appended claims.

What I claim is:

1. A bearing device comprising upper and lower housings or bearing-plates vertically movable the one with relation to the other and having plain bearing faces, a plurality of rollers interposed between said plates and means on said plates and said rollers to maintain the rollers constantly spaced at the same distance apart and constantly centered with respect to the application of the load.

2. In a bearing device, the combination with upper and lower housings or bearing plates vertically movable the one with relation to the other and having plain bearing faces, rotatable bearing members mounted between said plates with coöperative means on said plates and rotating members to maintain the latter constantly centered beneath the point of application of the load, and to maintain said rotatable members in such position when moved out of engagement with the bearing members by the tilting of the vehicle.

3. In a bearing device, the combination with upper and lower non-connecting housings or bearing plates having plain-faced runways, a plurality of rotatable members, said rotatable members being provided with a plurality of guide members, and guide members on said upper and lower plates adapted to coöperate with the first-named guide members to maintain the rotatable members properly spaced apart to center them constantly with respect to the point of application of the load and to retain them in such centered position when moved out of engagement with the bearing-plates by the tilting of the vehicle.

4. In a bearing device, the combination with upper and lower bearing plates vertically movable the one with relation to the other and having plain bearing faces forming runways, of a pair of bearing rollers each having a plurality of lugs on the ends thereof, said runways having guide paths on the sides formed therein to control said guide members on the rollers whereby said rollers will be maintained in central position beneath the point of application of the load at all times and will be retained in such centered position when moved out of engagement with the runways by the tilting of the car.

5. In a bearing device, the combination with upper and lower bearing plates vertically movable the one with relation to the other and having plain bearing faces forming runways, a pair of rollers interposed between said runways, means on said rollers and said upper runways to maintain said rollers suspended in centered position beneath the point of application of the load when raised out of engagement with the lower runway by the tilting of the car, and means on the lower runway to guide the rollers into centered position when the runways resume their normal position.

6. In a bearing device, the combination with upper and lower bearing plates vertically movable the one with relation to the other and having plain bearing faces forming runways, of a pair of rotatable bearing members each having guide means, and guide means also on said upper and lower bearing plates whereby the rotatable members will be constantly maintained in the centered position beneath the load irrespective of the number of turns which said rotatable members may make in the operation of the vehicle.

7. In a bearing device, the combination with upper and lower bearing plates vertically movable the one with relation to the other and having plain bearing faces forming runways and each having a slot arranged in a vertical plane, a pair of bearing rollers interposed between said bearing plates, said rollers being provided at the end with one or more lugs adapted to engage said slots, said slots being so formed as not to interfere with the rotation of said rollers but to guide the same to centered position beneath the point of application of the load at all times, and also to maintain the rollers in substantially centered position when the car body is tilted and the rollers are out of engagement with one or the other of said upper and lower bearing members.

8. In a bearing device, the combination with upper and lower bearing plates vertically movable the one with relation to the other and having plain bearing faces forming runways, each runway having V-shaped slots arranged in vertical planes, a pair of rollers each having a pair of guide lugs arranged at opposite sides on the same diameter of the rollers, said lugs being adapted to engage said V-shaped slots whereby said rollers are held constantly spaced an equal distance apart or constantly maintained in substantially central position beneath the point of application of the load, and when the car body is tilted said rollers will be suspended by said lugs and slots in the upper bearing member in centered position beneath the points of application of the load when the car is returned to horizontal position.

In testimony whereof, I the said VINCENT J. BURRY, have hereunto set my hand.

VINCENT J. BURRY.

Witnesses:
 JOHN F. WILL,
 J. R. KELLER.